No. 866,179. PATENTED SEPT. 17, 1907.
A. ANDRESEN.
COOKING IRON.
APPLICATION FILED AUG. 22, 1906.
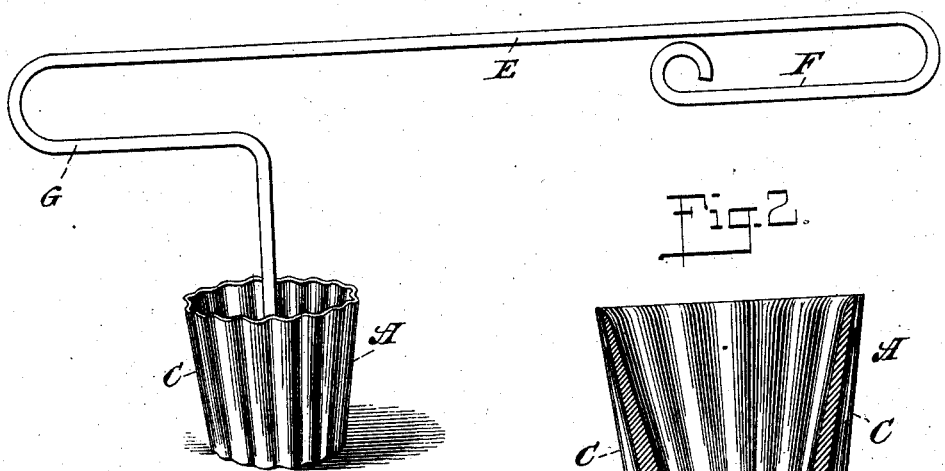
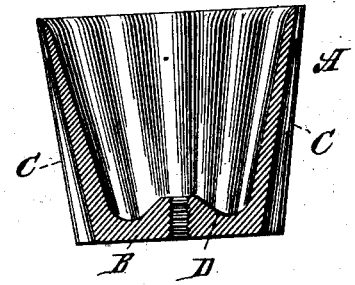
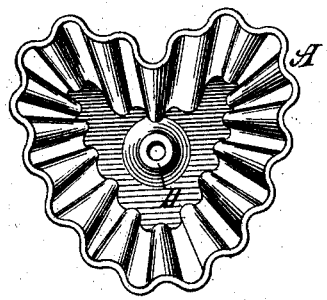
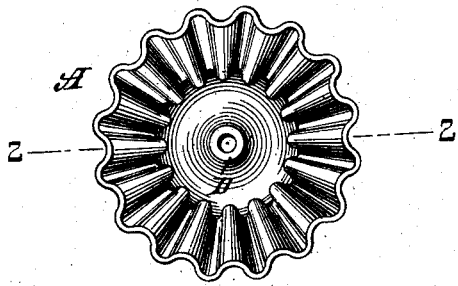
WITNESSES
INVENTOR
Alfred Andresen
BY
ATTORNEY

UNITED STATES PATENT OFFICE.

ALFRED ANDRESEN, OF MINNEAPOLIS, MINNESOTA.

COOKING-IRON.

No. 866,179.

Specification of Letters Patent.

Patented Sept. 17, 1907.

Application filed August 22, 1906. Serial No. 331,580.

*To all whom it may concern:*

Be it known that I, ALFRED ANDRESEN, a citizen of the United States, and a resident of Minneapolis, in the county of Hennepin and State of Minnesota, have made and invented certain new and useful Improvements in Cooking-Irons, of which the following is a specification.

My invention relates to an improvement in cooking irons and more particularly to an iron of this character usually known and referred to as a "patty" iron, that is, an iron devised for the purpose of cooking patty shells, the object being to so construct the article that the cake or patty shell will be more evenly and thoroughly cooked, and more evenly colored. Further, to devise an iron for this purpose which shall be lighter in weight, and therefore more convenient to handle than other irons of like character, and further, to devise an iron which shall be evenly balanced and remain in a standing or vertical position when placed within the pan while in use.

With these and other ends in view, the invention consists in certain novel features of construction and combinations of parts, as will be hereinafter fully described and pointed out in the claims.

In the accompanying drawings, Figure 1 is a view in perspective of a patty iron constructed in accordance with my invention. Fig. 2 is a sectional view taken on the line 2—2 of Fig. 3. Fig. 3 is a top plan view of the iron with the handle removed. Fig. 4 is a view of a modified form thereof.

Referring to the drawings, A represents the iron proper, made of metal, and preferably of cup-like form, that is, a hollow shell having a flat base B and diverging sides C, in order that the patty shell when cooked, may be easily and readily removed therefrom.

The iron shell A is preferably fluted or crimped on its outer surface, in order to impart the proper design to the patty shell, the interior surface of the metal cup or iron having the same configuration, if desired.

In Figs. 1, 2 and 3, I have shown the iron cup cylindrical, but if desired, it may be made of any other shape, as for instance, in Fig. 4, it is shown of heart-shape.

On the inner surface of the base B is formed the throat D, into which is threaded the handle E, one end of which is bent or curved as illustrated at F, to form a handle proper, and which is also bent in its length as illustrated at G, in order to properly balance the cup A, so that the latter will stand or remain in a vertical position within the pan while in use. By so constructing the iron with a detachable handle, the parts may be easily separated and packed in a small compass for transportation.

In practice, the iron is first dipped into melted lard and thoroughly heated, after which it is dipped into a batter, the latter clinging to the outer sides or surfaces of the iron. The iron is then placed in a pan or vessel of melted lard and entirely submerged, so that said melted lard will not only surround the batter clinging to the outer surface of the iron, but will also fill the interior thereof. The hot lard surrounding the outer side of the iron with its clinging batter, and also filling the cup, will thoroughly and evenly cook the batter and produce a far more evenly colored patty shell than has heretofore been possible with devices employed for the same purpose. After the cake or patty shell has been sufficiently cooked, the iron is removed from the pan and the shell allowed to fall or drop from the iron onto a plate or other proper receptacle, this result being obtained by reason of the comparatively thin walls of the iron A.

Having fully described my invention, what I claim as new and desire to secure by Letters Patent, is:—

A hollow cooking iron comprising a flat base portion and upwardly extending diverging sides, said sides being fluted alike on their inner and outer surfaces, said iron having a balancing handle secured to the center of the base portion, whereby it will be retained in an upright position, substantially as described.

Signed at Minneapolis, in the county of Hennepin, and State of Minnesota, this 11th day of July, A. D. 1906.

ALFRED ANDRESEN.

Witnesses:
C. E. MANN,
AGNES SEAQUIST.